Oct. 11, 1966   B. J. GAFFNEY   3,278,165
METHOD AND APPARATUS FOR GENERATING ACOUSTIC
VIBRATIONS IN FLOWING FLUIDS
Filed Feb. 25, 1963   6 Sheets-Sheet 1

INVENTOR.
DR. BERNARD J. GAFFNEY
BY
Thomas F. Moran
ATTORNEY

Oct. 11, 1966    B. J. GAFFNEY    3,278,165
METHOD AND APPARATUS FOR GENERATING ACOUSTIC
VIBRATIONS IN FLOWING FLUIDS
Filed Feb. 25, 1963    6 Sheets-Sheet 2

INVENTOR.
DR. BERNARD J. GAFFNEY
BY
Thomas J. Moran
ATTORNEY

Oct. 11, 1966    B. J. GAFFNEY    3,278,165
METHOD AND APPARATUS FOR GENERATING ACOUSTIC
VIBRATIONS IN FLOWING FLUIDS
Filed Feb. 25, 1963                                 6 Sheets-Sheet 3

INVENTOR.
DR. BERNARD J. GAFFNEY
BY
Thomas F. Moran
ATTORNEY

Oct. 11, 1966   B. J. GAFFNEY   3,278,165
METHOD AND APPARATUS FOR GENERATING ACOUSTIC
VIBRATIONS IN FLOWING FLUIDS
Filed Feb. 25, 1963

INVENTOR.
DR. BERNARD J. GAFFNEY
BY
Thomas F. Moran
ATTORNEY

INVENTOR.
DR. BERNARD J. GAFFNEY
BY
Thomas F. Moran
ATTORNEY

United States Patent Office 3,278,165
Patented Oct. 11, 1966

3,278,165
METHOD AND APPARATUS FOR GENERATING ACOUSTIC VIBRATIONS IN FLOWING FLUIDS
Bernard J. Gaffney, Stillwater, Minn., assignor to Sonic Engineering Corporation, Norwalk, Conn., a corporation of Connecticut
Filed Feb. 25, 1963, Ser. No. 260,735
7 Claims. (Cl. 259—1)

This invention relates to method and apparatus for generating acoustic vibrations in flowing fluids. More particularly, this invention relates to method and apparatus for producing acoustic vibrations in the sonic and/or ultrasonic range in flowing fluids.

It has already been proposed to induce acoustic vibrations in a flowing liquid by forming a fast moving, relatively flat jet of liquid and to cause the jet of liquid to impinge upon the leading edge of a flat blade or reed-like member. As the jet of liquid impinges upon the reed-like member the member is caused to vibrate, thereby generating acoustic vibrations in the surrounding liquid in contact therewith. Suitable apparatus for effecting such an operation is disclosed in U.S. 2,657,021 issued October 27, 1953 to Eric C. Cottell and John E. Goodman. In the apparatus disclosed therein the vibratory element, a flat reed-like member, is disposed opposite an orifice, positioned on the downstream side thereof in the direction of flow of liquid through the orifice, so that as the jet of liquid emerges from the orifice it pulses and impinges upon the leading edge or free end of the reed-like member and induces vibrations therein. The resulting vibrational movement of the reed-like member produces acoustic vibrations in the surrounding liquid. The apparatus disclosed therein is useful for effecting emulsification or homogenization of oil and water and for suspending solid matter in liquids and for like purposes.

In actual practice it has been found that in apparatus of the type disclosed in U.S. 2,657,021 the operating life of the vibratory element, the reed-like member, is relatively short. Due to the relatively violent and rapid vibrations induced in the reed-like member by the liquid jet impinging thereon breakage of the reed-like member occurs.

Also heretofore in the operation of the apparatus illustrated in U.S. 2,657,021 it has been the practice to position the vibratory element, the reed-like member, on the downstream side of the orifice so that the liquid emerging from the orifice directly impinges upon the free end of the reed-like member to cause the same to vibrate.

It is an object of this invention to provide an improved method and apparatus for inducing acoustic vibrations in a flowing fluid, such as a flowing liquid.

Another object of this invention is to provide improved methods and apparatus for producing vibrations in a vibratory element.

Another object of this invention is to provide an improved method and apparatus for inducing vibrations in a relatively flat, reed-like member.

Still another object of this invention is to provide a method and apparatus for increasing the operating life of a flat, reed-like vibratory member when vibrations are induced in said vibratory member by the flow of liquid in contact therewith.

Still another object of this invention is to provide an improved method and apparatus for the treatment of flowing fluids by subjecting said flowing fluids to acoustic vibrations in the sonic or ultrasonic range.

Yet another object of this invention is to provide an improved method and apparatus for effecting defibering and/or digestion of fibrous material.

How these and other objects of this invention are achieved will become apparent in the light of the accompanying disclosure made with reference to the accompanying drawings wherein:

FIG. 1 is a cross sectional view of an apparatus suitable for use in accordance with this invention for inducing acoustic vibrations in flowing fluids and the like;

It has now been discovered that in a process and/or apparatus wherein a flowing fluid is caused to actuate a vibratory element to vibrate the same to induce vibrations in the fluid in contact with and/or surrounding said vibratory element, improved results are obtainable when the fluid is caused to flow over and/or to impinge upon a vibratory element other than a flat, blade-like or reed-like member positioned relative to a jet of the fluid such that the jet of fluid directly impinges upon the free end of said reed-like member.

In accordance with one embodiment of this invention it has been discovered that to induce acoustic vibrations in a flowing fluid it is not necessary that a jet of liquid impinge directly upon the free end or leading edge of a blade-like or reed-like vibratory member but rather acoustic vibrations are induced in a flowing fluid with improved effect by employing an apparatus and/or method wherein fluid under accelerating or decelerating flow conditions, i.e. wherein the fluid velocity changes per unit of time, moves along and in contact with the vibratory element. More generally, and in accordance with this invention, acoustic vibrations are induced in a flowing fluid with improved effect by directing a fast movng and/or accelerating stream of fluid onto and/or along a vibratory element, such as a vibratory element having a fixed end and a free end, the fluid moving along said vibratory element in a direction from the fixed end toward the free end.

Figure 1:
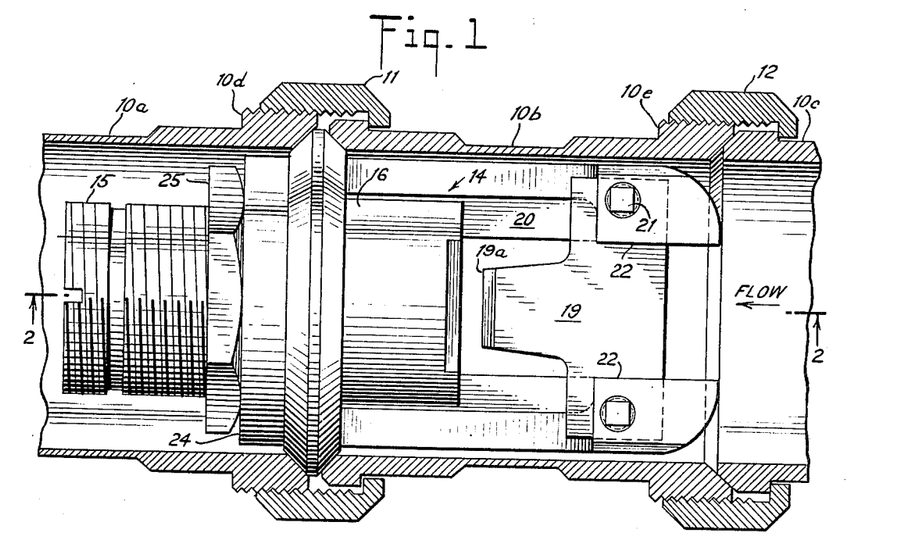
Figure 2:
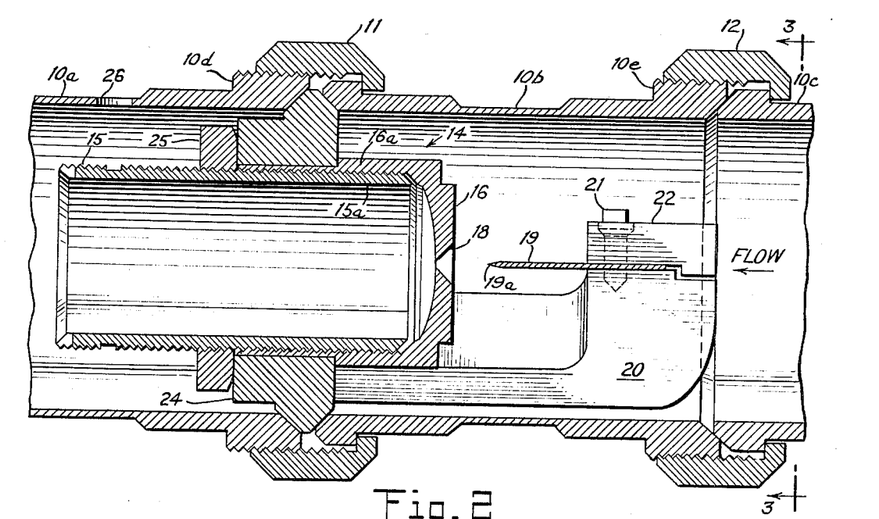
FIG. 2 is a cross sectional view taken along line 2—2 of the apparatus illustrated in FIG. 1.
Figure 3:
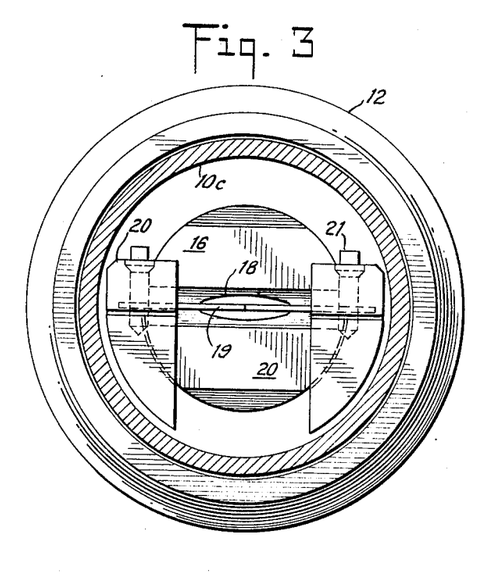
FIG. 3 is a cross sectional view taken along line 3—3 of the apparatus illustrated in FIG. 2.

Referring now to the drawings, particularly FIGS. 1, 2 and 3 thereof, there is illustrated therein an apparatus in accordance with the practices of this invention useful for inducing acoustic vibrations in a flowing fluid by causing a stream of fluid to move under accelerating flow conditions along and in contact with a blade-like or reed-like vibratory element. The apparatus illustrated in FIGS. 1–3 comprises segmented conduit means 10a, 10b, 10c. Conduit segment 10a is threaded at end 10d; conduit segment 10b is threaded at end 10e and threaded flanged couplings 11 and 12 serve, respectively, as illustrated, to join conduit segment 10a to conduit segment 10b and conduit segment 10b to conduit segment 10c.

Orifice structure, generally indicated by reference numeral 14, is provided within the segmented conduit means. Orifice structure 14 comprises an externally threaded, open ended cylinder 15 capped at end 15a by means of orifice cap 16. Orifice cap 16 is provided with an orifice or opening 18 presenting a slanting surface, converging in the direction of fluid flow therethrough, substantially equivalent to a convex surface, to the fluid flowing through orifice 18. The direction of fluid flow through orifice 14 is indicated by arrows in FIGS. 1 and 2 and means, not shown, are provided for moving the fluid, such as a liquid, through orifice 18 in the direction shown.

Blade-like or reed-like vibratory element 19 provided with leading edge 19a forming an acute angle, is positioned adjacent to and aligned with orifice 18 such that fluid moving toward and through orifice 18 moves under accelerating flow conditions along and in contact with vibratory element 19 close to, just before or as it enters and flows through orifice 18. Although a vibratory element 19 provided with a leading edge 19a forming an acute angle has been found to yield satisfactory results, the leading edge 19a may be flat or curved or form an obtuse angle or be recessed and still perform satisfactorily.

Vibratory element 19 is secured to holder 20 by means of screws 21 which threaddedly engage holes in holder 20 after passing through matching holes 17 in vibrating element 19 and holding plates 22.

Means are provided in orifice structure 14 for adjusting the distance between orifice 18 and the leading edge 19a of vibratory element 19. Such orifice to vibratory element distance adjusting means is provided by the internally threaded portion 16a of orifice cap 16. Depending upon the distance orifice cap 16 is screwed upon cylinder 15 the distance between orifice 18 and vibratory element 19 can be increased or decreased. Ring 24 provides locking-sealing means in combination with nut 25 for fixing the position of orifice cap 16 on cylinder 15 and preventing fluid from leaking from the apparatus between conduit segments 10a and 10b.

In the operation of the device illustrated in FIGS. 1–3 fluid is moved or pumped from means, not shown, into contact with and along vibratory element 19. As fluid moves along vibratory element 19 toward and through orifice 18 the velocity of the fluid increases, i.e. the fluid accelerates. Due to the accelerating flow of the fluid as it moves along and in contact with vibratory element 19 and due to the turbulent flow conditions existing within the apparatus an instability in vibratory element 19 is created and vibratory element 19 is caused to vibrate. Rapid vibration of vibratory element 19 induces acoustic vibrations in the fluid flowing therealong, these acoustic vibrations being in the sonic and/or ultrasonic range, acoustic vibrations having a frequency below about 20,000 cycles per second being considered in the sonic range and acoustic vibrations having a frequency in the range greater than about 20,000 cycles per second being considered in the ultrasonic range.

The acoustic vibrations thus induced in the flowing fluid are effective to cause defibering of fibrous material which may be dispersed in the flowing fluid, such as wood chips or particles and aid in their digestion or subequent chemical treatment, or emulsification, homogenization or dispersion of a dispersed phase, such as an immiscible liquid or solid particles, admixed with the flowing fluid and various other physical, physico-chemical and chemical effects in the flowing fluid. For example, apparatus and methods of this invention are useful for reducing the biochemical oxygen demand of liquids, such as organic material-containing waste effluent, and for producing water-in-oil and oil-in-water emulsions, e.g. Bunker C oil-in-water emulsions which are advantageously employed in combustion processes.

Additionally, the very rapid vibration of vibratory element 19 tends to produce cavitation in the flowing fluid. The cavitation phenomenon when present exerts a considerable influence upon the flowing fluid and contributes to the overall generation of acoustic vibrations within the flowing fluid. Cavitation is usually more pronounced at certain sites on the vibratory element, such as at and along and adjacent to leading edge 19a thereof and at roughness sites on the vibratory element 19 itself.

After passing through orifice 19 the thus treated fluid enters the interior of cylinder 15 and passes along and out of the apparatus via conduit segment 10a. As illustrated, conduit segment 10a is provided with inlet 26 which may be used for instrumentation purposes or for the introduction of a supplemental stream of fluid for eventual admixture with the treated fluid entering cylinder 15 via orifice 18. Also, if desired, a conduit, not shown, may be provided between inlet 26 in communication with the interior of cylinder 15 for more direct admixture of a supplemental stream of fluid with the acoustically treated fluid within cylinder 15.

Figure 4:
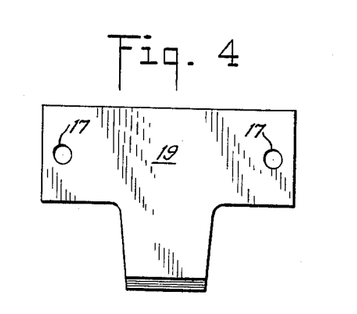
FIGS. 4 and 5 are plan views of reed-like vibratory elements of the type illustrated in FIGS. 1–3 and suitable for use in the apparatus of this invention.

Referring now to FIG. 4 of the drawings there is illustrated therein in plan view vibratory element 19 provided with holes 17 therethrough within which screws 21 are fitted. Vibratory element 19 may be made of any suitable, preferably corrosion resistant, material, such as steel, stainless steel and the like. Desirably, vibratory element 19 is made of fatigue resistant metal capable of withstanding vibratory stresses over an extended period of time. Also, if desired, vibratory element 19 may be coated with a ceramic material or other suitable coating to improve its corrosion resistance. Still further, vibratory element 19 may be provided with a coating of catalytically active material, such as platinum, silver and the like. Coating vibratory element 19 with a catalytic material serves to increase the effectiveness of the apparatus of this invention in the treatment of fluids to promote a chemical reaction or other physical, physico-chemical effect therein.

Figure 5:
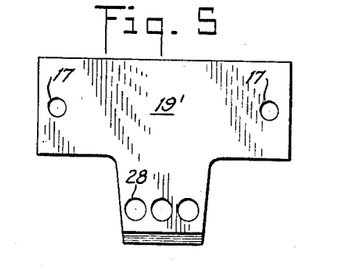

Referring now to FIG. 5, which shows a plan view of another vibratory element 19', the vibratory element illustrated therein is provided with holes 28 extending therethrough. Holes 28 in the vibratory element serve to subject the fluid to shear forces as the fluid flows along vibratory element 19 under accelerating flow conditions to effect vibrational movement of vibratory element 19. Holes 28, accordingly, tend to increase the effectiveness of the vibratory element when employed as a means for effecting dispersion, size reduction, defibering, homogenization or emulsification of a dispersed phase flowing with the fluid undergoing treatment as it moves along in contact with vibratory element 19.

Figures 6A, 6B:
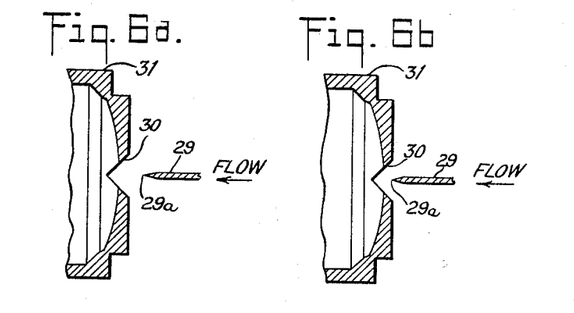
FIGS. 6a, 6b and 6c are fragmentary cross sectional views illustrating the various positions which might be employed in the practices of this invention of a vibratory element relative to an orifice.
Figure 6C:
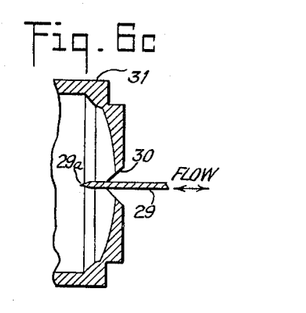

Referring now to FIGS. 6a, 6b and 6c of the drawings, there are shown therein various modifications and embodiments of the practice of this invention with respect to the position of vibraory element 29 and orifice 30 provided in an orifice structure 31.

In accordance with this invention as shown in FIG. 6a the front or free end or leading edge 29a of the vibratory element 29 may be positioned a distance h, such as a distance in the range 1/16–3/8 of an inch, more or less, from orifice 30. If desired, as illustrated in FIG. 6b, leading edge 29a of vibratory element 29 may be positioned flush with or immediately adjacent the entrance fo orifice 30. Further, as illustrated in FIG. 6c, vibratory element 29 may be positioned so as to extend into and through orifice 30 so that the acoustic vibrations generated within the fluid flowing under accelerating flow conditions along vibratory element 29 and through orifice 30 influence the flowing fluid on the downstream side of orifice 30 in the direction of fluid flow therethrough. In the embodiment of the invention illustrated in FIG. 6c wherein the vibratory element extends within and/or through orifice 30 the fluid flow, as illustrated, may be in either direction through the orifice since in both instances of flow the fluid passing through orifice 30 flows under accelerating flow conditions along and in contact with vibratory element 29.

Figure 7:
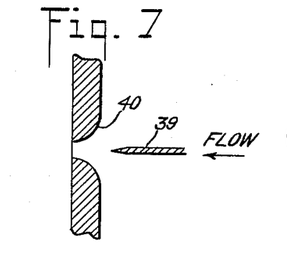
FIG. 7 is a fragmentary cross sectional view showing the profile of an orifice in an apparatus useful in the practices of this invention.

Referring now to FIG. 7 of the drawings, there is illustrated therein an arrangement of vibratory element 39 with orifice 40 wherein the orifice presents a convex, converging surface with respect to the flow of fluid moving therethrough. The flow-converging surface of orifice 40 serves to promote better flow conditions through orifice 40 to reduce pressure losses as the fluid being treated moves along vibratory element 39 toward and through orifice 40. In general, however, the surface of the orifice both at the entrance and/or at the exit thereof may have any suitable shape or contour depending upon the results desired and/or the configuration of the vibratory element employed in combination therewith.

Figure 8:
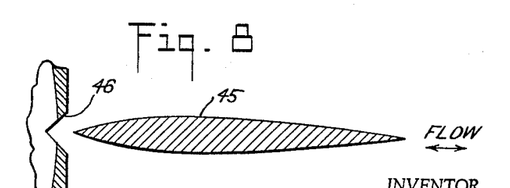
FIG. 8 shows in fragmentary cross sectional view a combination of orifice and air-foil shaped vibratory member useful in the practices of this invention.

Referring now to FIG. 8, there is illustrated therein another embodiment in accordance with this invention wherein the vibratory element 45 is provided with an air-foil shape, symmetrical on both sides, and used in association with orifice 46. As indicated, the fluid flow in such a combination of elements may be in either direction along air-foil shape vibratory element 45. If desired, the upper and lower surfaces of vibratory element 45 need not be symmetrical. For example, the upper surface may be curved and the lower surface planar, or vice versa, or the upper and lower surfaces may possess different curved shapes. Fluid flow along vibratory element 45 toward and through orifice 46 or through orifice 46 toward and along vibratory element 45 in actual operation would be under turbulent flow conditions thereby tending inherently to create an instability with respect to vibratory element 45 and serving to promote vibratory motion thereof. Upon vibration of vibratory element 45 acoustic vibrations are generated in the flowing fluid. Any imbalance of the forces acting upon vibratory element 45 due to fluid flow therealong would create vibrational movement of vibratory element 45.

Figures 9, 10, 11, 12:
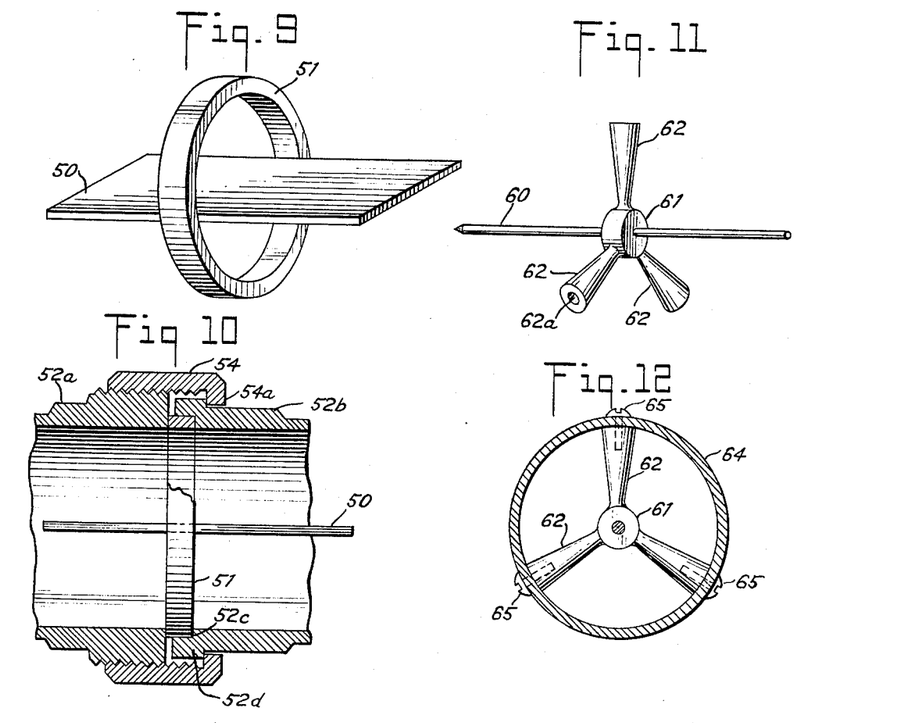
FIG. 9 is a perspective view of a special vibratory element assembly.
FIG. 10 is a fragmentary cross sectional view illustrating the installation of the special vibratory element of FIG. 9 in a conduit.
FIG. 11 is a perspective view of another special vibratory element.
FIG. 12 is a partial cross sectional view showing the installation of the special vibratory element of FIG. 11 in a conduit.

Referring now to FIGS. 9 and 10 of the drawings which illustrate a special vibratory element in accordance with this invention, the vibratory element illustrated comprises a flat plate or blade-like member 50 supported by suitable means, such as welds, on two sides by ring 51. Ring 51 is fitted between two conduit segments 52a and 52b within annular notch 52c of conduit segment 52b. The outside end of conduit segment 52a is threaded. Collar 54 is threaded thereon and inwardly extending flange 54a thereof engages outwardly extending flange 52d so that as collar 54 is screwed upon threaded end of conduit segment 52a, conduit segment 52b is drawn toward conduit segment 52a and compresses and fixes ring 51 therebetween.

The vibratory element comprising plate 50 and ring 51 is advantageously employed in the practice of this invention to create acoustic vibrations in the fluid flowing therealong since substantially the entire cross sectional area of the conduit is available for flow of the fluid being treated thereby avoiding undue pressure drops due to restrictions in the flow path of the fluid.

As shown in FIGS. 9 and 10, plate 50 is centrally supported and fixed to ring 51. If desired, ring 51 may be adapted and positioned to support plate 50 closer to one end thereof than the other end. Further, as illustrated, ring 51 may be fixed, as by welding, to both sides of plate 50 along a substantial length thereof. The length along the sides of plate 50 at which it is supported and fixed to ring 51 can be varied.

Referring now to FIGS. 11 and 12 which show another embodiment of the vibratory element in accordance with the practices of this invention, as illustrated, the vibratory element comprises a needle-shaped member 60 centrally supported by hub 61. Hub 61 is provided with arms 62 radially extending therefrom. Hub 61 and needle 60 carried thereon are centrally supported and fixed within conduit 64 by means of screws 65 which extend through suitable openings in conduit 64 to threadedly engage arms 62 within hole 62a provided therein. Like plate 50 of the vibratory element assembly illustrated in FIGS. 9 and 10, needle 60 may be centrally fixed and supported along its length or supported by and fixed to hub 61 closer to one end of needle 60 than the other end thereof.

The vibratory elements illustrated in FIGS. 9–12 are generally useful either in the apparatus in accordance with this invention wherein the vibratory element is placed and employed under conditions such that the fluid undergoing treatment moves under accelerating flow conditions along and in contact with the vibratory element or in apparatus or under conditions such that the fluid undergoing treatment is formed as a high velocity jet or fast moving stream and directed to impinge upon the vibratory element. Accordingly, the vibratory elements as illustrated in FIGS. 9–12 may be positioned upstream or downstream of an orifice and in line therewith.

Figure 13:
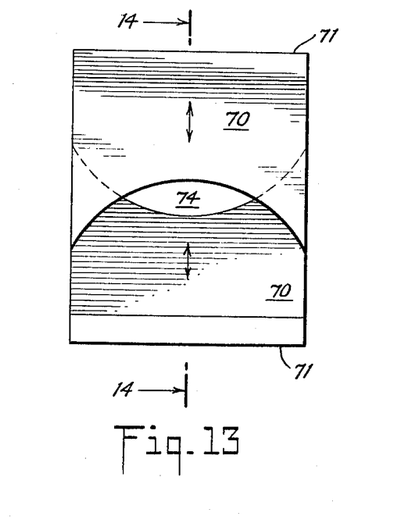
FIG. 13 is a view showing the orifice of an adjustable orifice assembly useful in the practice of this invention.
Figure 14:
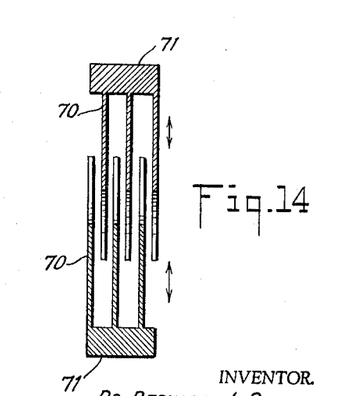
FIG. 14 is a cross sectional view of the orifice assembly of FIG. 13 taken along line 14—14.

Referring now to FIGS. 13 and 14 of the drawings, there is schematically illustrated therein another embodiment of this invention, a variable orifice structure. The variable orifice structure comprises interleafing plates 70 which are supported by suitable means 71 capable of moving or withdrawing plates 70 in the direction indicated. The ends of plates 70 are arcuate shaped so that as plates 70 are withdrawn or moved in a direction toward support means 71 the orifice 74 formed by plates 70 becomes larger and as the plates are moved in a direction away from support means 71 orifice 74 formed by plates 70 becomes smaller.

In the operation of the orifice structures illustrated in FIGS. 13 and 14, the thin walls of interleafing plates 70 tend to vibrate as the fluid moves as a high velocity jet through orifice 74. The vibrations of interleafing plates 70 contribute to and may comprise a substantial portion of the acoustic vibrations induced in the fluid.

Figure 15:
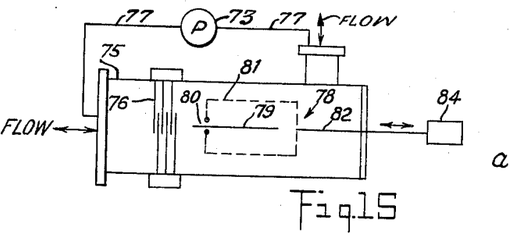
FIG. 15 is a schematic view of a special apparatus and method in accordance with this invention for inducing acoustic vibrations in flowing fluids.

FIG. 15 schematically illustrates another embodiment in accordance with this invention. As illustrated therein conduit 75 is provided with controllable, variable orifice 76, such as the type illustrated in FIGS. 13 and 14. Positioned within conduit 75 in line with orifice 76 is vibratory element assembly generally indicated by reference numeral 78. Vibratory element assembly 78 comprises a reed or blade 79 fixedly supported at end 80 to suitable support means 81. Support means 81 is adapted for reciprocating movement toward and away from orifice 76 by means of rod 82 actuated by means 84 which imparts relatively rapid reciprocating movement to bar 82 and ultimately to blade 79.

In operation, when fluid is moved by pump 73 via line 77 through the device illustrated in the direction such that vibratory element assembly 78 can be considered positioned on the downstream side of orifice 76 in the direction of fluid flow therethrough, as fluid moves through orifice 76 and tends to set up vibrations therein, blade 79 is reciprocatingly moved by means 84 so that the fixed end 80 of blade 79 rapidly moves toward and away from orifice 76 thereby tending to induce additional acoustic vibrations in the flowing fluid. In the instance where the fluid undergoing treatment is pumped in the other direction through the apparatus so that the vibratory element assembly 78 can be considered on the upstream side of orifice 76 substantially the same effects are obtainable.

Figure 16:
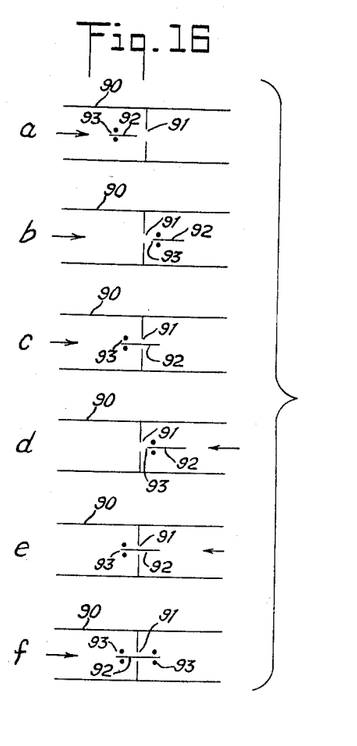
FIGS. 16a, 16b, 16c, 16d, 16e, 16f, 17a, 17b, 17c, 17d, 18 and 19 are schematic representations of various apparatus and processes in accordance with this invention for inducing acoustic vibrations in flowing fluids.

Referring now to FIGS. 16a, 16b, 16c, 16d, 16e and 16f of the drawings, there are schematically illustrated various embodiments in the practice of this invention wherein a vibratory element, such as a reed-like or blade-like member or any of the other types illustrated herein wherein the vibratory element has a fixed end and a free end, is employed in association with an orifice for generating acoustic vibrations in the flowing fluid. In these figures conduit 90 is provided with an orifice 91 therein. Positioned in line with orifice 91 is vibratory element 92 having a fixed end 93 schematically illustrated by two dots. In FIG. 16a vibratory element 92 is located upstream of orifice 91 with the fixed end 93 being positioned upstream of the other or free end of vibratory element 92. In FIG. 16b vibratory element 92 is positioned downstream of orifice 91 with fixed end 93 thereof positioned upstream relative to the free end of vibratory element 92. In FIG. 16c vibratory element 92 is positioned to extend through orifice 91 such that the fixed end 93 thereof is positioned upstream of orifice 91 and the free end of vibratory element 92 is positioned downstream of orifice 91. In FIG. 16d the vibratory element 92 is positioned upstream of orifice 91 with the fixed end 93 positioned downstream of the free end of vibratory element 92. In FIG. 16e vibratory element 92 is positioned to extend through orifice 91 with fixed end 93 thereof downstream of orifice 91 and the free end of vibratory element 92 positioned upstream of orifice 91. In FIG. 16f vibratory element 92 is fixed at both ends thereof and positioned to extend through orifice 91 so that one fixed end 93 of vibratory element 92 is positioned downstream of orifice 91 and the other fixed end 93 of vibratory element 92 is positioned upstream of orifice 91.

Figure 17:
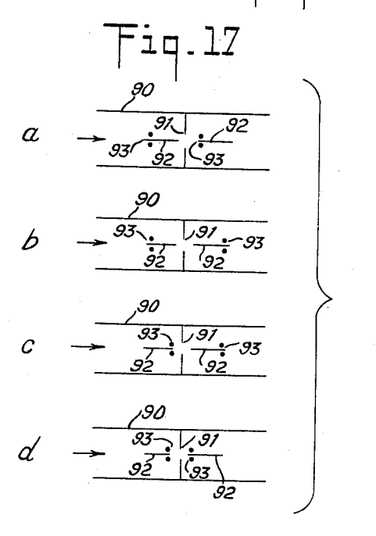

Referring now to FIGS. 17a, 17b, 17c and 17d of the drawings, there are illustrated therein various embodiments in accordance with this invention employing a plurality of vibratory elements. In FIG. 17a there is illustrated a plurality of vibratory elements 92 disposed in line with respect to orifice 91 within conduit 90, one vibratory element being wholly upstream of orifice 91 and another vibratory element 92 being wholly downstream of orifice 91. In the upstream vibratory element the fixed end 93 thereof is disposed upstream with respect to the free end thereof and in the downstream vibratory element fixed end 93 thereof is positioned upstream relative to the free end thereof. In FIG. 17b one vibratory element 92 is positioned upstream of orifice 91 and another vibratory element 92 is positioned downstream of orifice 91. In the upstream vibratory element the fixed end thereof is positioned upstream relative to the free end and in the downstream vibratory element the fixed end thereof is positioned downstream of the free end. In FIG. 17c two vibratory elements 92 are illustrated, one upstream of orifice 91 and the other downstream of orifice 91. In the upstream vibratory element the fixed end 93 thereof is positioned downstream of the free end and in the downstream vibratory element the fixed end is disposed downstream of the free end. In FIG. 17d two vibratory elements 92 are also illustrated, one upstream of orifice 91 and the other downstream of orifice 91. In the upstream vibratory element the fixed end 93 thereof is downstream of the free end and in the downstream vibratory element the fixed end thereof is positioned upstream relative to the free end.

Figure 18:
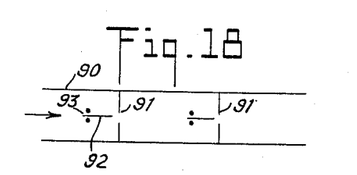

In FIG. 18 there is illustrated conduit 90 provided with a plurality of orifices 91 disposed in series within conduit 90. Associated with each of the orifices 91 is vibratory element 92. Each vibratory element 92 is disposed such that the fixed end 93 thereof is disposed upstream of its free end.

Figure 19:
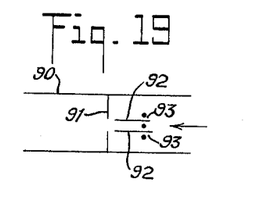

In FIG. 19 of the drawings there is illustrated conduit 90 provided with orifice 91. Disposed in line with orifice 91 in substantially parallel relationship are a plurality of vibratory elements 92. The vibratory elements are disposed upstream with respect to orifice 91 and arranged such that the fixed ends 93 thereof are located upstream with respect to the free ends thereof.

Figure 20:
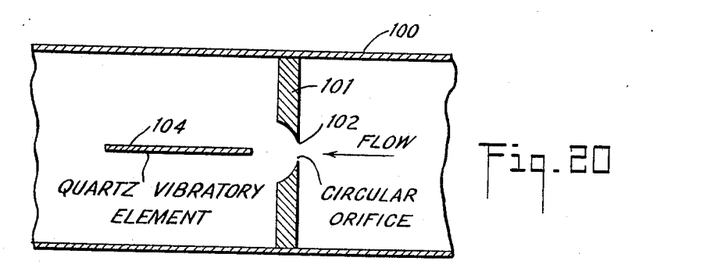
FIG. 20 is a schematic view of a special apparatus in accordance with this invention comprising a circular orifice and a quartz rod vibratory element.

In FIG. 20 of the drawings there is illustrated therein conduit 100 provided with orifice plate 101 therein. Orifice plate 101 is provided with a circular orifice 102 on the upstream face, the orifice being concavely diverging on the downstream side. Immediately downstream of orifice 102 is positioned a quartz vibratory element 104, such as a quartz rod, adapted to vibrate as fluid is moved through orifice 102 to directly impinge and/or flow along upon vibratory element 104.

Figure 21:
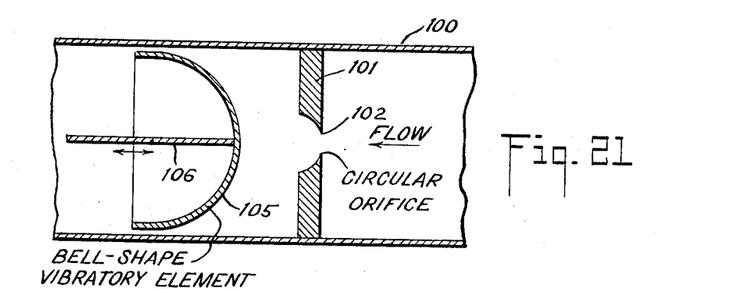
FIG. 21 is a schematic view of a special apparatus in accordance with this invention comprising a circular orifice and a bell shape vibratory element.

In FIG. 21 of the drawings there is disclosed substantially the same arrangement with respect to conduit 100 and orifice 102 as illustrated in FIG. 20. In FIG. 21, however, the vibratory element comprises a bell shape member 105 which is suitably supported within conduit 100 and positioned and adapted with respect to orifice 102 such that as fluid moves through orifice 102 it impinges upon bell shape vibratory element 105 and causes the same to vibrate. Additionally, means, not shown, operative through support rod 106 fixed to the downstream side of bell shape vibratory element 105, impart a rapid, reciprocating, translational motion to bell shape vibratory element 105.

Figure 22:
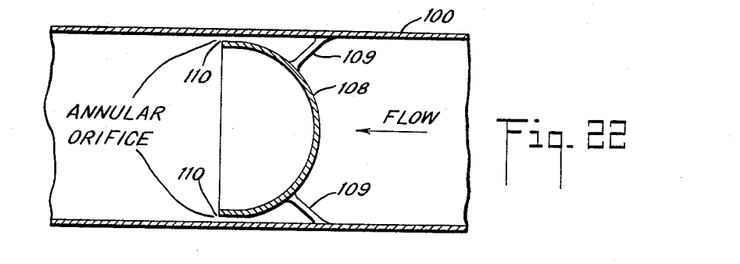
FIG. 22 is a schematic view of a special apparatus in accordance with this invention employing an annular orifice.

Referring now to FIG. 22 of the drawings, there is illustrated therein conduit 100 provided with a bell shape member 108 fixed to conduit 100 by means of support struts or spider 109. Bell shape member 108 is dimensioned and positioned within conduit 100 to provide an annular orifice 110 therebetween. Annular orifice 110 thus provided within conduit 100 is generally useful in devices and processes in accordance with this invention, particularly wherein the vibratory element is annular in shape and disposed downstream of the annular orifice so that fluid moving through the annular orifice directly impinges upon and/or flows along the annular vibratory element.

Figure 23:
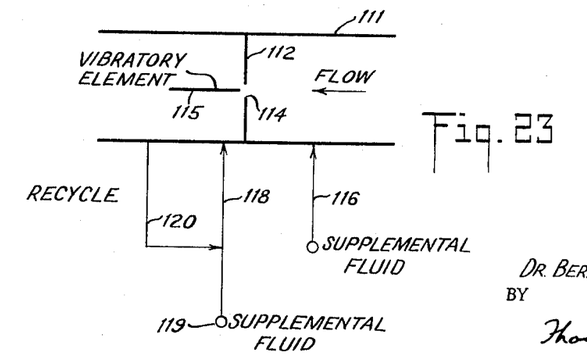
FIG. 23 is a view wherein various process flow schemes in accordance with this invention and employing recycle and/or supplemental fluid streams upstream or downstream of the fluid orifice are schematically illustrated.

Referring now to FIG. 23 of the drawings, there is illustrated in highly schematic form processing techniques employing an orifice and a vibratory element in accordance with this invention for the treatment of flowing streams. Streams which may be treated in accordance with this embodiment of the invention include wood pulp or paper pulp slurries for defibering or size reduction, slurries of frangible solid materials for size reduction of the solids, miscible and non-miscible fluid admixtures, such as oil and water admixtures for emulsification or dispersion of one phase, e.g. oil, in another phase, e.g. water.

As indicated in FIG. 23 conduit 111 is provided with orifice structure 112 defining orifice 114 therethrough. Immediately downstream of orifice 114 vibratory element 115 is positioned such that as fluid is moved through orifice 114 the fluid directly impinges and/or flows along vibratory element 115 to induce vibrations therein. These vibrations are imparted to the fluid within conduit 111 on the downstream side of orifice structure 112.

To modify the fluid treating operations conduit 116 is provided for the injection into conduit 111 just before orifice 114 of a supplemental stream of fluid which may be different from and/or the same as the fluid flowing in conduit 111 through orifice 114 or one or more of the components of such fluid. Conduit 118 is also provided for the introduction of fluid into conduit 111 immediately downstream of orifice 114 and in close association with vibratory element 115. The fluid introduced via conduit 118 may be derived from any suitable source 119 or may be recycled fluid withdrawn from conduit 111 and reintroduced via conduits 120 and 118.

Figure 24:
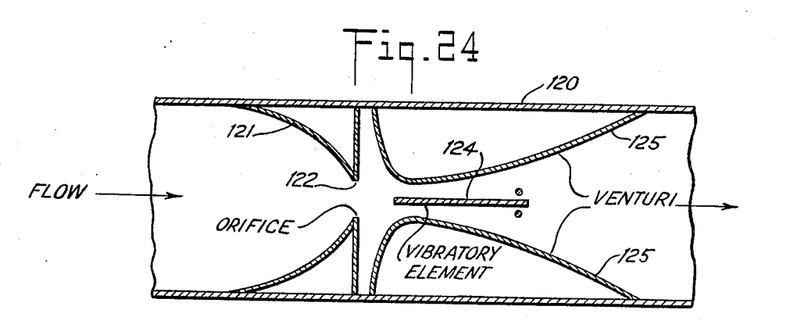
FIGS. 24 and 25 are schematic views of arrangement of apparatus in accordance with this invention comprising an orifice, a vibratory element and means for bringing the fluid undergoing treatment in close association and relatively prolonged contact with the vibratory element.

Referring now to FIG. 24 of the drawings, there is illustrated therein still another embodiment of the practice of this invention. As illustrated, conduit 120 has positioned therein orifice plate 121 provided with orifice 122 therethrough. On the downstream side of orifice 122 vibratory element 124 is positioned so that the jet of fluid emerging from orifice 122 directly impinges upon and/or flows along vibratory element 124. Vibratory element 124 is positioned within the throat of a venturi formed within conduit 120 by form 125. By positioning vibratory element 124 within the throat of the venturi the vibrations generated in the flowing fluid due to the vibrations of vibratory element 12 are concentrated, thereby tending to assure that all of the fluid undergoing treatment and moving through orifice 122 and the venturi is subjected to the acoustic vibrations generated by vibratory element 124.

Vibratory element 124 may have any suitable shape of the type disclosed and/or illustrated herein, such as blade shape or needle shape and the like.

Figure 25:
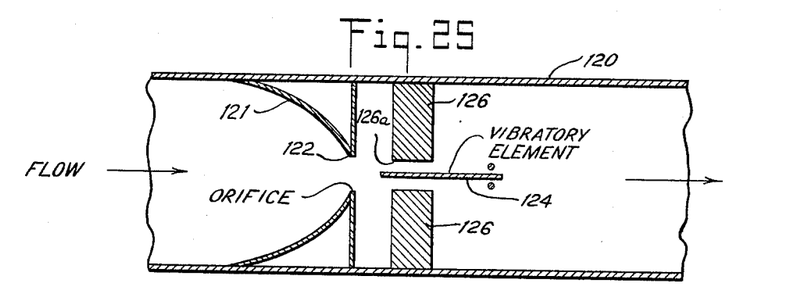

Referring now to FIG. 25 of the drawings, an arrangement similar to the arrangement illustrated in FIG. 24 is shown. As illustrated in FIG. 25 conduit 120 is provided with orifice plate 121 which has orifice 122 therethrough. Vibratory element 124 is positioned downstream of orifice 122 and is positioned relative thereto so that the fluid flowing through orifice 122 impinges upon and/or flows along vibratory element 124 to induce vibrations therein. Constricting means 126 is provided within conduit 120 to encompass vibratory element 124 so as to concentrate the acoustic vibrations generated by vibratory element 124 within the flowing fluid to assure a more uniform and intense treatment of the fluid flowing through the opening 126a defined by constricting means 126 which may comprise, as illustrated, a barrier or wall of substantial thickness provided with opening 126a.

Figure 26:
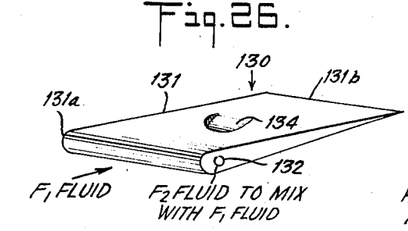
FIG. 26 is a somewhat schematic perspective view of an air-foil shaped vibratory element useful for effecting fluid-fluid mixing.

Referring now to FIG. 26 of the drawings, there is illustrated a vibratory element generally indicated by the reference numeral 130 suitable for use in the various apparatus in accordance with this invention. As illustrated vibratory element 130 comprises an air-foil shaped body or blade 131 having a curved, relatively thick, blunt front end 131a and a thin straight trailing edge or end 131b. Blade 131 is provided with an inlet 132 toward the thick front end 131a which communicates with an opening 134 on one face of blade 131. In operation blade 131 is inserted in a suitable holder, such as a holder of the type illustrated in FIGS. 9 and 10 of the drawings, and positioned in a conduit and disposed therein so that a jet or stream of fluid impinges upon front end 131a of blade 131 and causes blade 131 to vibrate. By suitable means supplementary or extraneous fluid is supplied via inlet 132 for discharge via outlet 134 on the surface of blade 131 so as to change the vibratory characteristics of blade 131 and/or effect an intimate admixing of the fluid impinging upon the front end 131a of blade 131 with the fluid entering blade 131 via inlet 132 and discharging therefrom via outlet 134.

Figure 27:
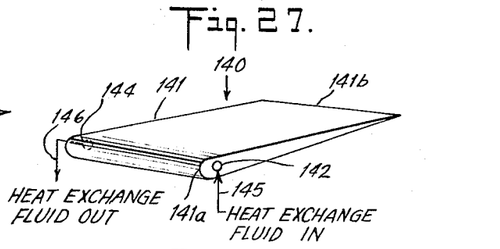
FIG. 27 is a somewhat schematic perspective view of an air-foil shaped vibratory element useful for effecting a change in temperature in fluid moving in contact therewith.

Referring now to FIG. 27 of the drawings, there is illustrated therein a vibratory element generally indicated by reference numeral 140 similar in configuration to an air-foil and comprising a relatively flat smooth blade 141 provided with a blunt, curved front end 141a and a thin straight trailing end or edge 141b. Blade 141 is provided with an inlet 142 at the thick portion thereof towards front end 141 and an outlet 144 shown in dashed outline. Conduit means 145 and 146 are shown associated with inlet 142 and outlet 144, respectively, for the supply and discharge of heat exchange fluid to blade 141. In operation, blade 141 is disposed in a conduit and positioned therein by means of a suitable holder, such as a holder of the type illustrated in FIGS. 9 and 10 of the drawings, and positioned so that a jet or fast moving stream of liquid impinges upon the front end 141a of blade 141 to cause blade 141 to vibrate. Simultaneously, heat exchange fluid, hot or cold, is introduced into blade 141 from conduit 145 via inlet 142 and discharges via outlet 144 and conduit 146. The passage of heat exchange fluid through blade 141 serves to add or take away heat from the fluid impinging upon blade 141 and causing blade 141 to vibrate, thereby changing the temperature of the fluid impinging upon blade 141. Because of the very rapid vibratory motion of blade 141 the formation of a stagnant film on the surface of blade 141 which would adversely affect heat transfer rates is minimized and it is possible by employing this embodiment of the invention to achieve very high heat transfer rates and to effect transfer of relatively very large amounts of heat to and from the fluid impinging upon blade 141. Alternatively, if it is desired to effect heating of the impinging fluid, electrical resistance elements (not shown) can be incorporated within the structure of blade 141 so that, by suitable means not shown, upon the flow of current through these electrical resistance elements a large amount of heat can be caused to flow directly from said resistance elements to the activating fluid. In accordance with this embodiment of the invention electrical resistance elements may be incorporated within the body of blade 141 or installed on the surface thereof for direct contact with the activating fluid.

Figure 28:
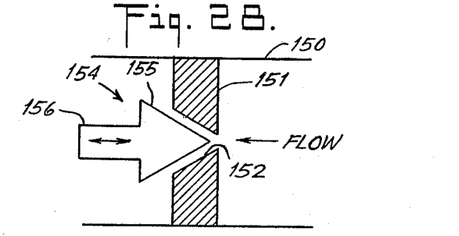
FIG. 28 is a highly schematic view of an arrangement of a circular orifice and a conically shaped vibratory element adapted and disposed in accordance with one embodiment of this invention.

Referring now to FIG. 28 of the drawings, there is shown therein another embodiment of the practice of this invention comprising a conduit 150 provided with an orifice structure 151 having a tapered cylindrical orifice 152. Disposed in association therewith is a conical vibratory element generally indicated by reference numeral 154. Vibratory element 154, which may be a solid or hollow body, comprises a conical head portion 155 matching the tapered portion of orifice 152 and a shaft or holder 156 movable, by means not shown, in a direction toward or away from orifice 152 whereby the annular opening between the surface defining orifice 152 and conical head 155 of the vibratory element can be increased or decreased. Exemplary of this embodiment of the practice of the invention, at a flow rate of about 500 gallons per minute of wood pulp through orifice 152 wherein the spacing between conical head 155 and orifice 152 is uniformly 3/16 of an inch along orifice 152, satisfactory results with respect to defibering of wood chips and the like would appear to be achieved.

Figure 29:
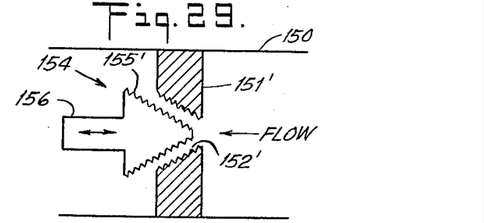
FIG. 29 is another highly schematic view of an arrangement of a threaded, tapered circular orifice and a matching threaded conically shaped vibratory element adapted and disposed in accordance with another embodiment of this invention.

Still another embodiment of this invention is illustrated in FIG. 29 of the drawings. This embodiment of the invention is similar to the embodiment illustrated in FIG. 28 and the same reference numerals, but primed, have been employed to designate like or equivalent parts. The principal structural differences between the embodiment illustrated in FIG. 29 and the embodiment of FIG. 28 are that the orifice 152' illustrated in FIG. 29 is internally threaded, such as with eight threads per inch, left hand threads, and conical head 155' of FIG. 29 is externally threaded, such as with eight threads per inch, right hand threads. Conical head 155' is adapted to be moved into and out of orifice 152' and to threadedly engage the same whereby the annular opening defined by conical head 155' and orifice 152' can be increased or decreased depending upon the distance conical head 155 is moved into orifice 152.

The apparatus and methods of this invention are useful for the treatment of cellulose fibers to effect defibering. Samples of refined continuous cooker stock diluted to about 3% consistency and containing finely divided bundles of cellulose fibers were subjected to acoustic vibrations generated by a vibratory element in an apparatus in accordance with this invention as illustrated in FIGS. 1–3 of the drawings. Microscopic examination of the resulting treated material indicated definite separation of cellulosic fibers from the cellulosic fiber bundles.

Slurries of cellulosic material known in the trade as "white water" was subjected to acoustic vibrations in an apparatus in accordance with this invention. Prior to treatment the white water showed a biochemical oxygen demand of about 2300 p.p.m. B.P.D. After treatment in accordance with this invention by being subjected to acoustic vibrations while passing through the apparatus in accordance with this invention the biochemical oxygen demand was reduced to about 1800 p.p.m. B.P.D., a reduction of about 22%. In other tests a reduction in B.O.D. as high as 45% was obtained. This reduction in biochemical oxygen demand is significant and is indicative of the usefulness of the apparatus and methods of this invention in the treatment of waste materials to reduce or prevent stream pollution.

Further, actual tests have demonstrated that when the vibratory element to orifice distance is in the range 1/16" to 1/8" and in the range from 5/8" to 3/4" peak acoustic pressures within the flowing fluid undergoing treatment are obtained. It was also observed that when the fluid undergoing treatment flows under conditions of accelerating flow along and in contact with the vibratory element, breakage of the vibratory element, e.g., breakage of the blade type illustrated in FIG. 4 of the drawings, is reduced and less power is required to effect acoustical treatment of fluids being processed.

The devices of this invention are also useful for effecting dispersion and/or production of fine particle size material in a carrier liquid, such as emulsifying or dispersing a liquid stream into another liquid stream, one of said liquids being at least partially immiscible in the other liquid, such as creating fine particle size polymeric material, e.g., polyethylene, polypropylene, by introducing a liquid stream containing said polymeric material, dissolved in a suitable solvent if desired, into admixture with a precipitating carrier liquid, such as water, just before or just after said carrier liquid enters or passes through a suitable orifice but before said carrier liquid contacts or impinges upon a vibratory element to generate acoustic vibrations with the resulting formation of a dispersion of finely divided polymeric material in said carrier liquid.

As will be apparent to those skilled in the art in the light of the foregoing disclosure, many modifications, alterations and substitutions are possible in the practice of this invention without departing from the spirit or scope thereof.

I claim:

1. Apparatus useful for producing acoustic vibrations in a flowing liquid comprises a body provided with an orifice, a vibratory element and means for moving liquid toward and through said orifice and past said vibratory element, said vibratory element being located downstream of said orifice in the direction of flow of said liquid therethrough and positioned relative to said orifice to vibrate as said liquid is moved toward and through said orifice and past said vibratory element, said vibratory element having a fixed end and a free end, said fixed end being disposed upstream of said liquid relative to said free end.

2. Apparatus useful for producing acoustic vibrations in a flowing liquid comprising an orifice structure, a vibratory element and means for moving liquid toward and through said orifice structure, said vibratory element being positioned with respect to said orifice structure to vibrate as said liquid is moved toward and through said orifice structure, said orifice structure comprising a plurality of spaced, separate interleafing plates defining an opening in said orifice structure for the flow of liquid therefrom, said interleafing plates being movable relative to each other in a direction transverse of the flow of liquid through the opening defined thereby, the movement of said orifice plates serving to vary the size of the opening in said orifice structure through which the liquid is moved.

3. Apparatus useful for producing acoustic vibrations in a flowing liquid comprising a housing including an inlet and an outlet, said housing being adapted for the flow of liquid therethrough, an orifice structure provided with an orifice disposed within said housing such that liquid flowing through said housing passes through said orifice structure, a vibratory element disposed within said housing on the downstream side of the liquid flowing therethrough with respect to said orifice, said vibratory element being adapted to be placed in the path of the liquid as it emerges from said orifice and being adapted to move toward said orifice into said path of said liquid and to vibrate as said liquid emerging from said orifice comes into contact therewith.

4. Apparatus in accordance with claim 3 wherein said vibratory element comprises a substantially flat reed.

5. Apparatus in accordance with claim 3 wherein said orifice is contoured so that the liquid as it emerges from said orifice structure via said orifice is in the form of a flat jet.

6. A method of generating acoustic vibrations in a flowing liquid which comprises moving a stream of liquid under accelerating flow conditions along and/or in contact with a vibratory element, thereupon directing said stream of liquid under accelerating flow conditions toward and through an adjustable orifice, said orifice being adjustable with respect to the cross sectional area available for the flow of liquid therethrough, said vibratory element being adjustable with respect to the distance between said vibratory element and said orifice in the direction of flow of said liquid and adjusting the size of said orifice and the distance between said orifice and said vibratory element to optimize the generation of acoustic energy in the flowing liquid.

7. Apparatus useful for producing acoustic vibrations in a flowing liquid comprising a body provided with an orifice, said orifice being defined by a thin wall structure so that as fluid flows through said orifice vibrations tend to be induced in said thin wall structure, a blade-like vibratory element and means for moving fluid past said blade-like vibratory element toward and through said orifice, at least a portion of said blade-like vibratory element being located upstream of said orifice in the direction of flow of said fluid therethrough and positioned relative to said orifice to vibrate as said fluid is moved by said means toward and through said orifice, the resulting vibration of said blade-like vibratory element generating acoustic vibrations in the flowing fluid.

References Cited by the Examiner

UNITED STATES PATENTS

| | | | |
|---|---|---|---|
| 2,037,663 | 4/1936 | Lalor | 138—45 X |
| 2,592,526 | 4/1952 | Seed | 260—29.6 |
| 2,664,850 | 1/1954 | Smith | 116—137 |
| 2,713,998 | 7/1955 | Eicken. | |
| 2,715,384 | 8/1955 | Meng | 116—137 |
| 2,792,804 | 5/1957 | Bouyoucos et al. | 259—1 |
| 2,804,042 | 8/1957 | Gavreau | 116—137 |
| 2,874,909 | 2/1959 | Pallmann | 241—28 |
| 2,959,561 | 11/1960 | Kelley | 260—29.6 |
| 3,076,610 | 2/1963 | Rosenfeld et al. | 241—28 |
| 3,081,979 | 3/1963 | Lindsey | 259—1 |
| 3,096,080 | 7/1963 | Willems | 259—1 |
| 3,169,013 | 2/1965 | Jones | 259—4 |

FOREIGN PATENTS 831,836    2/1952    Germany.

WALTER A. SCHEEL, *Primary Examiner.*

JOHN M. BELL, *Assistant Examiner.*